April 26, 1932. R. BARCLAY 1,855,899
TRANSMISSION MECHANISM
Filed Dec. 23, 1929    2 Sheets-Sheet 2

Robert Barclay INVENTOR
per A. D. Fitzpatrick
ATTORNEY

Patented Apr. 26, 1932

1,855,899

UNITED STATES PATENT OFFICE

ROBERT BARCLAY, OF GLASGOW, SCOTLAND

TRANSMISSION MECHANISM

Application filed December 23, 1929, Serial No. 416,161, and in Great Britain December 31, 1928.

The invention relates to the transmission mechanism of automobiles and has for its object to provide means for facilitating the changing of gear.

The invention consists in providing automobiles with an improved auxiliary clutch which is embodied in the transmission mechanism of the automobile between the gears and road wheels, and the construction and arrangement of which is as set forth hereinafter, with particular reference to the claims.

In order that the invention may be clearly understood one embodiment thereof will be described by way of example and with reference to the accompanying drawings, whereon:—

Figure 1:
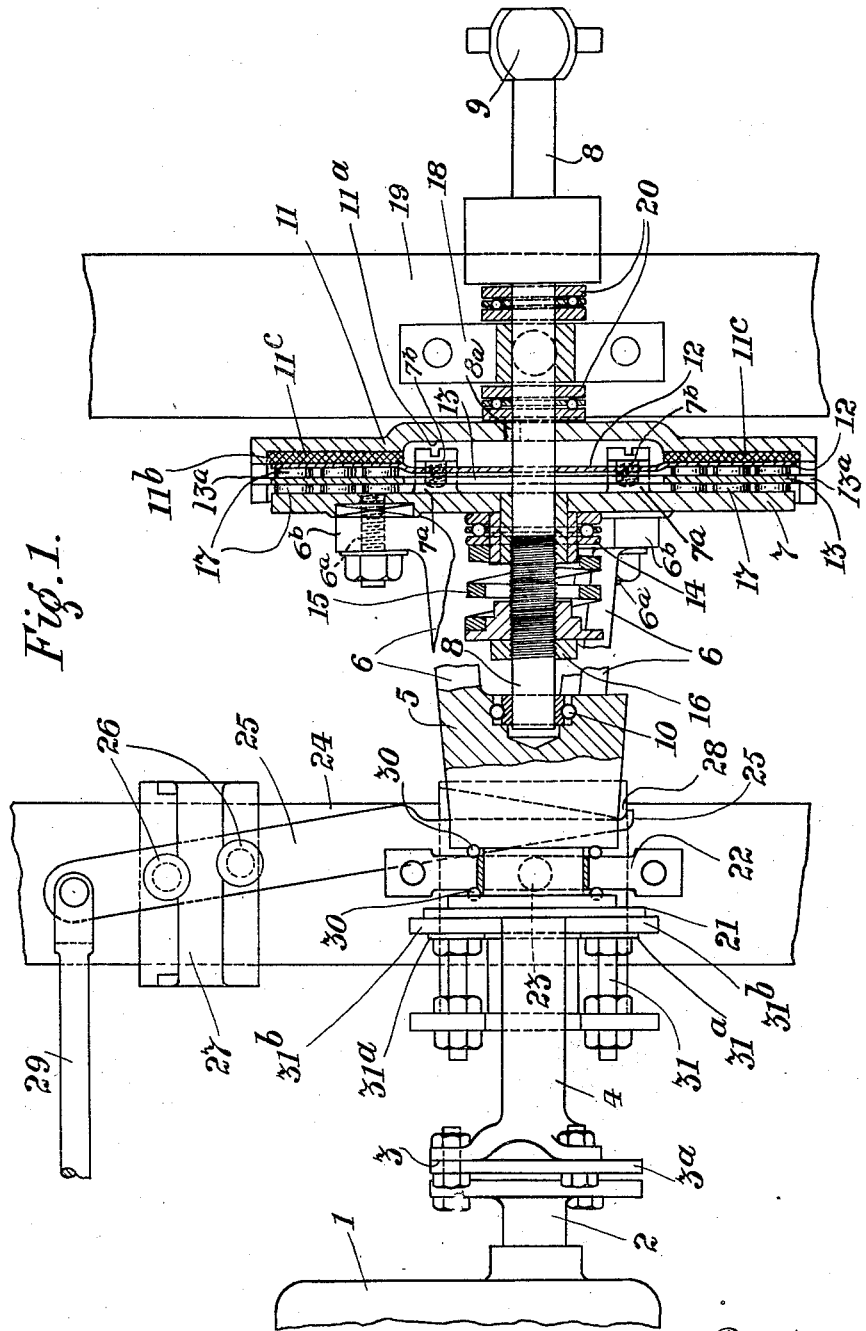
Figure 2:
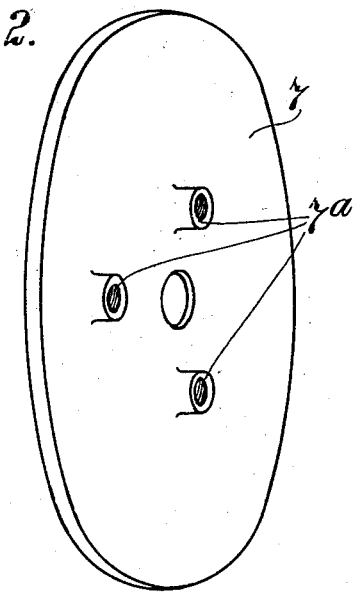
Figure 3:
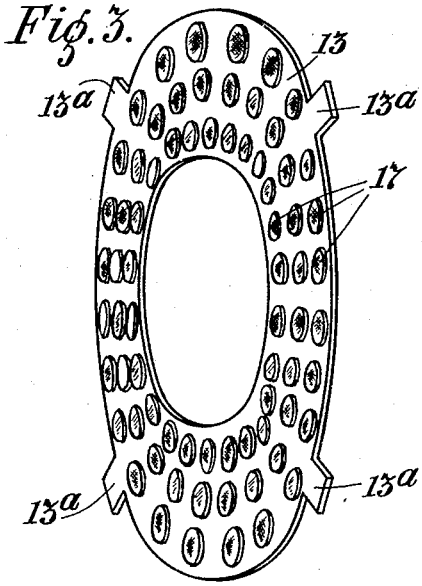
Figure 4:
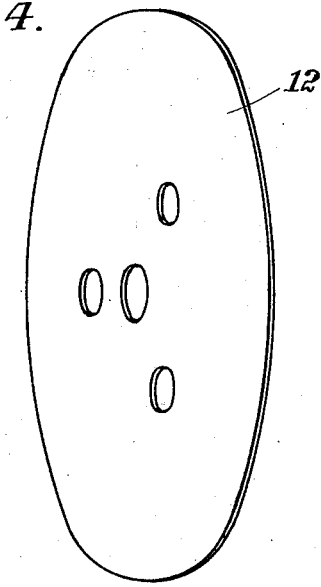
Figure 5:
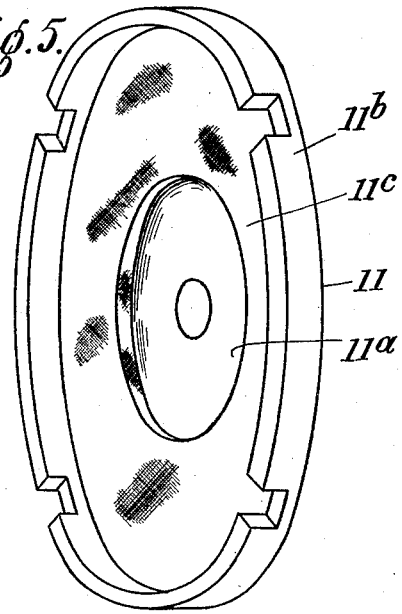

Fig. 1 is a plan view in axial section of an auxiliary clutch in accordance with this invention, and Figs. 2, 3, 4 and 5 constitute perspective views of the several clutch elements.

Referring to Fig. 1, the numeral 1 denotes the rear end of the gear box of an automobile and 2 the driving shaft leaving it. The shaft 2 is connected by a flexible coupling 3 comprising a ring of flexible material 3ª to a length of shaft 4 having a boss 5 at its rear end from which a spider 6 extends rearwardly. A forward clutch plate 7 (see Fig. 2) is secured, as shown in Fig. 1 to the spider 6, by studs 6ª and squared portions 6ᵇ at the ends of the limbs of the spider. As also seen from Fig. 1, the studs 6ª and squared portions 6ᵇ are located at points situated between bosses 7ª (Fig. 2) and lugs 13ª (Fig. 3) more fully referred to below.

The propeller shaft 8 of the vehicle extends forward from a joint 9 and enters at its forward end a ball bearing 10 located in a cavity in the rear end of the boss 5. This shaft 8 is made fast by a key 8ª with a rear clutch plate 11 (see Fig. 5) which has a dished central part 11ª, a flange 11ᵇ and a ring of friction fabric 11ᶜ. A bare metal plate 12 and an inset plate 13 are fitted loosely and centrally on to the shaft 8 which also passes loosely through the forward clutch plate 7. The forward clutch plate 7 has three bosses 7ª on it into which studs 7ᵇ can be screwed, these studs and bosses being adapted to pass through the central aperture of the inset plate 13 into three holes in the metal plate 12 to transmit part of the drive to the metal plate 12.

A thrust bearing 14 is provided at the forward side of the plate 7 and a coil spring 15, arranged coaxially with the shaft 8, is held between a nut 16 screwed on to the shaft and this bearing. As a result, the forward clutch plate 7, inset plate 13 and plate 12 are pressed together and against the rear clutch plate 11 and normally the clutch is engaged. The inset plate 13 has lugs 13ª adapted engage with recesses in the flange of the plate 11, which flange encloses the clutch plates. The insets 17 in the plate 13 are of friction material.

The shaft 8 is supported in a rigid bearing 18 on a transverse member 19 of the chassis. Before and behind the bearing 18 there are ball thrust bearings 20, 20.

On the shaft 4 a rigid collar 21 is provided in front of the boss 5 and an operating collar 22 is loosely fitted around the shaft between the collar 21 and the boss 5. A pin 23 projects downwards from the operating collar 22 into a slot in a transverse member 24 of the chassis. An operating lever 25 has two upright studs 26 whereby it is guided below a bar 27 fixed on the member 24. One end of the lever 25 bears on a fixed abutment 28 while its other end is connected to an operating rod 29. Ball bearings 30 are provided at either side of the collar 22.

A structure 31 is rigidly fixed on the chassis and comprises a member 31ª of U-shape in elevation and faced with friction material 31ᵇ. The shaft 4 passes between the limbs of this member 31ª, 31ᵇ, the collar 21 being near to, but not in contact with, the friction material 31ᵇ when the clutch is engaged.

The operation of the device is as follows:—

Normally the spring 15 presses the clutch members together and establishes the drive from the gear box to the rear axle. When it is desired to change gear, the clutch pedal is depressed and releases the engine clutch in front of the gear box. At the same time, the rod 29 draws forward the end of the operating lever 25 which forces the pin 23 and the operating collar 22 forward. The shaft 4, boss 5 and forward clutch plate 7 are moved forward against the spring 15, the slight movement (about 1/16 inch) being allowed for by the flexible coupling 3 which yields. The auxiliary clutch is thereby released and the gear box isolated front and rear. At the same time, the forward movement of the shaft 4 brings the collar 21, fixed on said shaft, into contact with the friction material 31^b and the shaft 4 and gear box elements are instantly brought to rest. Any gear change can be made without noise or shock in the stationary gears regardless of the speed of the vehicle. The provision of the braking means for the gears is very important. Its presence makes a great difference in the operation of the mechanism. I have found it possible to engage reverse gear with the car running ahead and to use reverse gear as a brake for the vehicle. By putting the gear into neutral, coasting can be effected and any gear can be re-engaged without the slightest difficulty.

It will be understood that numerous variations may be made in the mechanism without departing from the scope of the invention. For example, the numbers of driving and loose plates in the auxiliary clutch may be varied and one of the members of the auxiliary clutch may have a sliding connection to the shaft. Auxiliary clutch mechanism in accordance with the invention can be embodied in any vehicle in which there is sufficient space between the rear of the gears and the road wheels to accommodate it.

What I claim is:—

1. For use in means for facilitating gear changing in automobiles, a clutch comprising a driving element, a main driving plate, auxiliary driving plate means, a main driven plate faced with friction material, auxiliary driven plate means faced with friction material, a driven member on which said main driven plate is secured and which passes freely through said main driving plate and said auxiliary driving and driven plate means rotatably into said driving element, a number of projections on said driving plate passing through a central aperture in said auxiliary driven plate means and engaging with said auxiliary driving plate means, peripheral means on said auxiliary driven plate means adapted to engage with peripheral means on said main driven plate, a spider means on said driving element, means for securing said spider to said driving plate at points situated between said projections and said peripheral means, and spring means adapted to press said driving and driven plates and plate means normally together whilst permitting said driving and driven plates to be declutched from one another.

2. For use in means for facilitating gear changing in automobiles, a clutch comprising a driving shaft, a boss on one end of said driving shaft, a main driving plate, an auxiliary driving plate, a main driven plate faced with friction material, an auxiliary driven plate faced with friction material, a driven shaft on which said main driven plate is secured and which passes freely through said main driving plate and said auxiliary driving and driven plates, a bearing in said boss for the end of said driven shaft, a number of projections on said driving plate passing through a central aperture in said auxiliary driven plate and engaging with holes in said auxiliary driving plate, peripheral lugs on said auxiliary driven plate adapted to engage with peripheral recesses on said main driven plate, an open multiple legged spider integral with said boss, means for securing said spider to said driving plate at points between said projections and said peripheral lugs and recesses, and a coil spring around said driven shaft adapted to press said main and auxiliary driving and driven plates normally together whilst permitting said driving and driven plates to be declutched from one another.

In testimony whereof I affix my signature.

ROBERT BARCLAY.